US012584045B2

(12) United States Patent
Lin et al.

(10) Patent No.: US 12,584,045 B2
(45) Date of Patent: Mar. 24, 2026

(54) CARBON BLACK, SEALANT COMPRISING THE SAME AND ITS APPLICATION

(71) Applicant: Linyuan Advanced Materials Technology Co., Ltd., Kaohsiung City (TW)

(72) Inventors: Ya-Syuan Lin, Kaohsiung City (TW); Jheng-Guang Li, Kaohsiung City (TW)

(73) Assignee: LINYUAN ADVANCED MATERIALS TECHNOLOGY CO., LTD., Kaohsiung City (TW)

( * ) Notice: Subject to any disclaimer, the term of this patent is extended or adjusted under 35 U.S.C. 154(b) by 0 days.

(21) Appl. No.: 18/817,123

(22) Filed: Aug. 27, 2024

(65) Prior Publication Data

US 2025/0075108 A1 Mar. 6, 2025

(30) Foreign Application Priority Data

Aug. 29, 2023 (TW) ................................. 112132585

(51) Int. Cl.
| | |
|---|---|
| *C09J 9/02* | (2006.01) |
| *C09C 1/48* | (2006.01) |
| *C09J 11/04* | (2006.01) |
| *C08K 3/04* | (2006.01) |

(52) U.S. Cl.
CPC *C09J 9/02* (2013.01); *C09C 1/48* (2013.01); *C09J 11/04* (2013.01); *C01P 2004/04* (2013.01); *C01P 2004/50* (2013.01); *C01P 2004/62* (2013.01); *C01P 2004/64* (2013.01); *C01P 2006/12* (2013.01); *C01P 2006/19* (2013.01); *C01P 2006/40* (2013.01); *C08K 3/04* (2013.01); *C08K 2201/001* (2013.01); *C08K 2201/005* (2013.01); *C08K 2201/006* (2013.01); *C08K 2201/011* (2013.01)

(58) Field of Classification Search
None
See application file for complete search history.

(56) References Cited

FOREIGN PATENT DOCUMENTS

| | | | | | |
|---|---|---|---|---|---|
| CN | 104830259 | A | * 8/2015 | ............. | C08G 59/50 |
| JP | 2001302885 | A | * 10/2001 | ..... | H01L 2924/0002 |
| JP | 2018131610 | A | * 8/2018 | ................ | C08J 5/18 |
| TW | I796678 | B | 3/2023 | | |

* cited by examiner

*Primary Examiner* — Khanh T Nguyen
(74) *Attorney, Agent, or Firm* — Jordan IP Law LLC

(57) ABSTRACT

A carbon black with high insulating properties is provided. The carbon black satisfies the following conditions (a) and (b): (a) the nitrogen adsorption specific surface area (NSA) is greater than 0 m²/g and less than or equal to 130 m²/g; and (b) the oil absorption number is greater than 0 cc/100 g and less than or equal to 95 cc/100 g.

15 Claims, 21 Drawing Sheets

CARBON BLACK, SEALANT COMPRISING THE SAME AND ITS APPLICATION

This application priority under 35 U.S.C. § 119 to Taiwanese Patent Application No. 112132585, filed Aug. 29, 2023, the entireties of which are incorporated by reference herein.

The present disclosure relates to a carbon black and, in particular, to a highly insulating modified carbon black.

BACKGROUND

Currently, electronic products are developing towards the trend of being light, thin, short, and small. As the size of electronic products continues to decrease, the distance between devices becomes smaller, making the insulation of the sealant used to protect the devices more important.

It is known that sealant is mainly composed of resin and curing agent. Carbon black can be further added as needed to give the sealant color and further improve the mechanical properties of the sealant. In the conventional technology, the research on the insulation properties of sealants focuses on the resin used in it, without studying other components. As a result, the insulation properties of the sealant are limited by the insulation properties of the resin itself and are difficult to be further improved, which further limits the application of sealant.

SUMMARY

In view of the above problems, a purpose of the present disclosure is to provide a sealant with high insulation properties.

To achieve the above purpose, the present disclosure provides a carbon black, which satisfies the following conditions (a) and (b): (a) a nitrogen adsorption specific surface area (NSA) being greater than 0 m²/g and less than or equal to 130 m²/g; and (b) an oil absorption number being greater than 0 cc/100 g and less than or equal to 95 cc/100 g.

Preferably, the nitrogen adsorption specific surface area is greater than 0 m²/g and less than or equal to 65 m²/g. More preferably, the nitrogen adsorption specific surface area is greater than 0 m²/g and less than or equal to 36 m²/g. Further preferably, the nitrogen adsorption specific surface area is greater than 0 m²/g and less than or equal to 32 m²/g.

Preferably, the oil absorption number is greater than 0 cc/100 g and less than or equal to 92 cc/100 g. More preferably, the oil absorption number is greater than 0 cc/100 g and less than or equal to 80 cc/100 g.

Preferably, the carbon black satisfies the following conditions (c): (c) a primary particle size ranging from 45 nm to 70 nm. More preferably, the primary particle size ranges from 50 nm to 70 nm.

Preferably, the carbon black satisfies the following conditions (d): (d) an aggregate particle size ranging from 120 nm to 550 nm. More preferably, the aggregate particle size ranges from 120 nm to 400 nm.

Preferably, the carbon black satisfies the following conditions (e): (e) a volatile content of 1 wt % to 5wt %.

Preferably, the carbon black satisfies the following conditions (f): (f) a resistivity being greater than or equal to 0.020 Ω*cm.

The present disclosure further provides a sealant, which comprises: a resin; a hardener; and the carbon black described above.

Preferably, the sealant comprises a defoaming agent.

Preferably, the sealant is electronic potting glue.

The present disclosure further provides a use of the carbon black described above, which is used for a sealant.

Preferably, the sealant is electronic potting glue.

The inventor of the present application unexpectedly discovered that when carbon black meets certain conditions, not only can the insulation properties of the carbon black powder itself be improved, but when applied to a sealant, the sealant can also have high insulation properties.

DETAILED DESCRIPTION OF THE PRESENT EMBODIMENTS

Figure 1A:
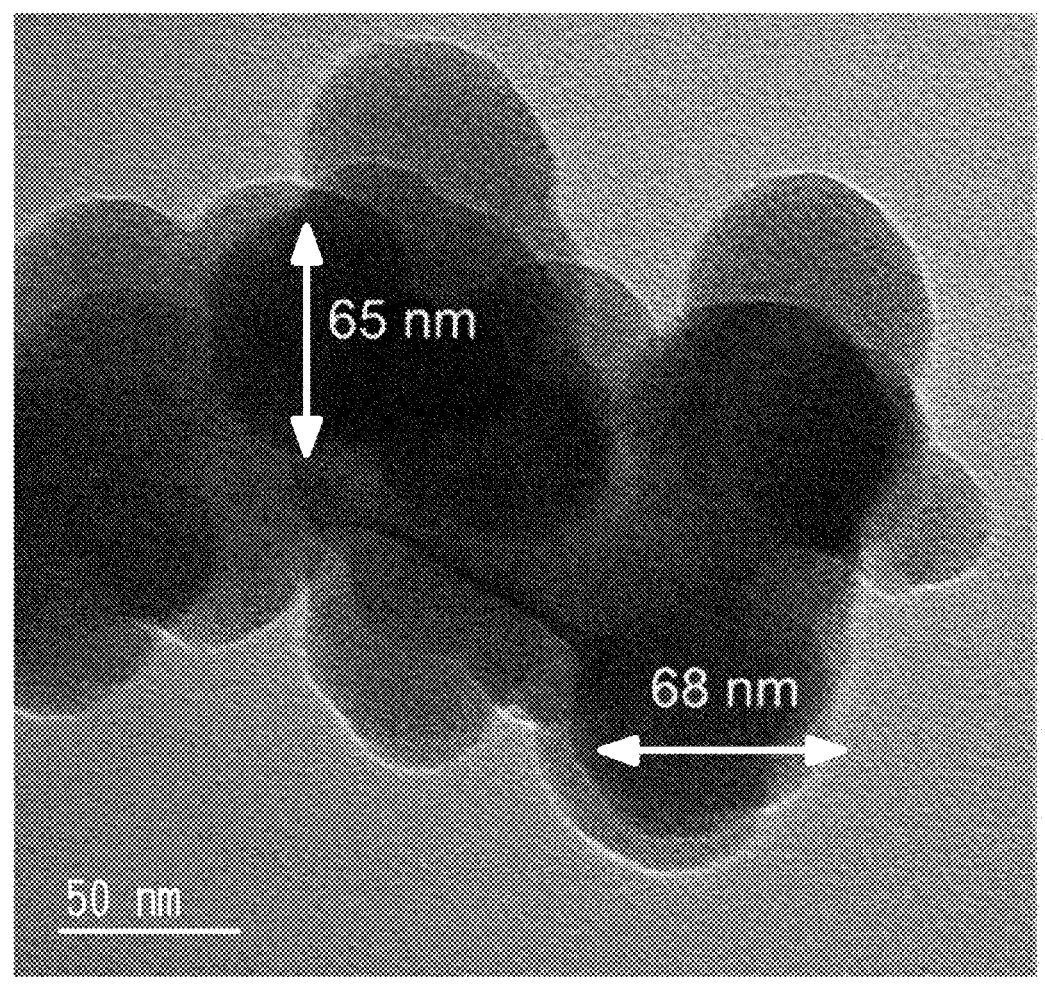
FIG. 1A, FIG. 1B, FIG. 1C and FIG. 1D are transmission electron microscope (TEM) photos of the carbon black of Production Example 1.
Figure 1B:
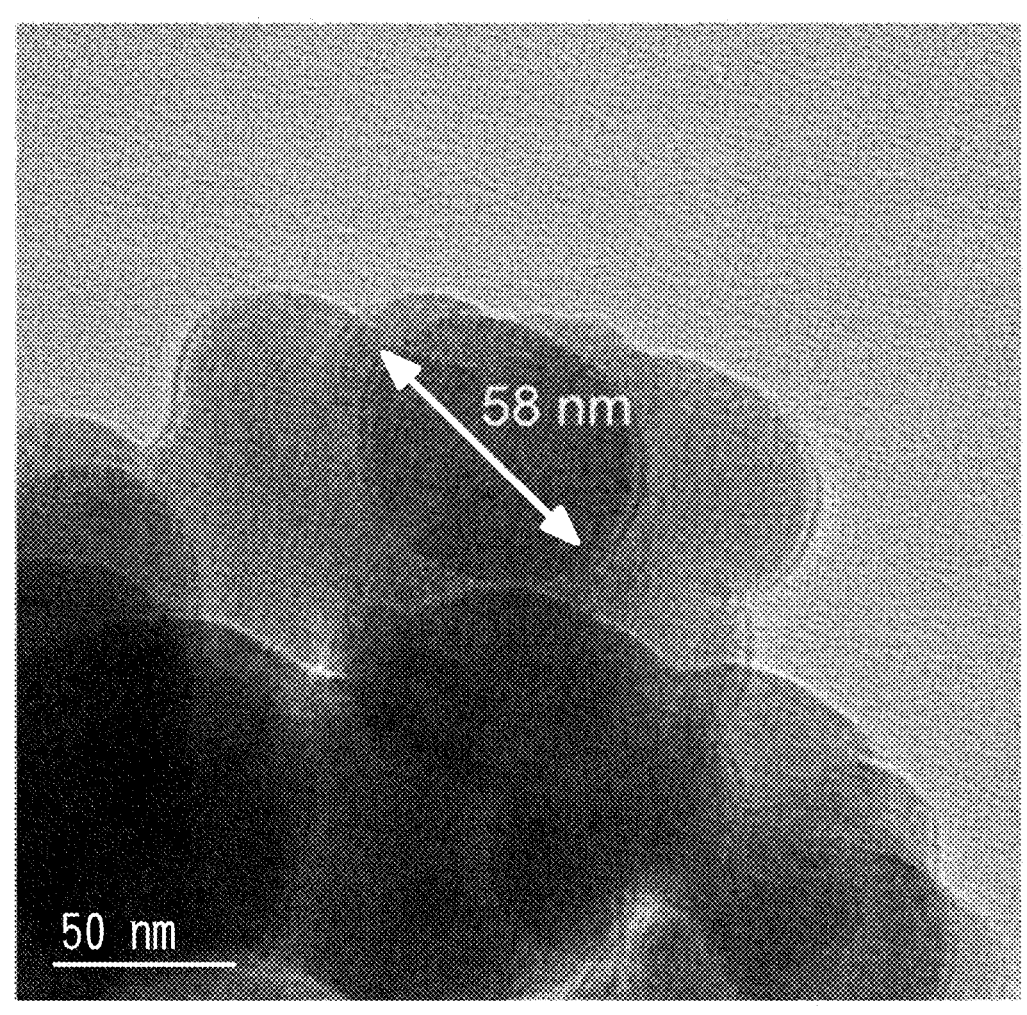
Figure 1C:
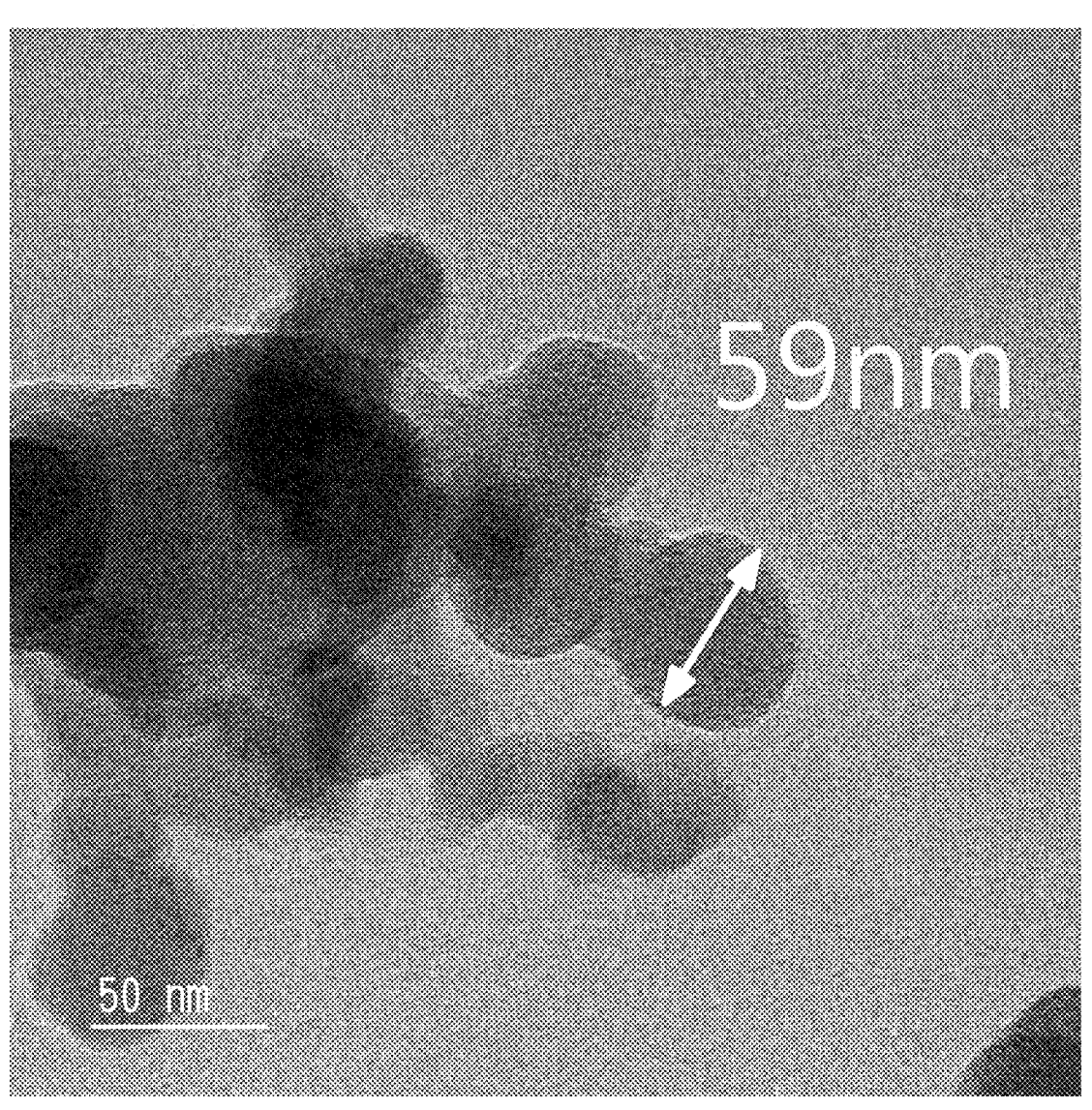
Figure 1D:
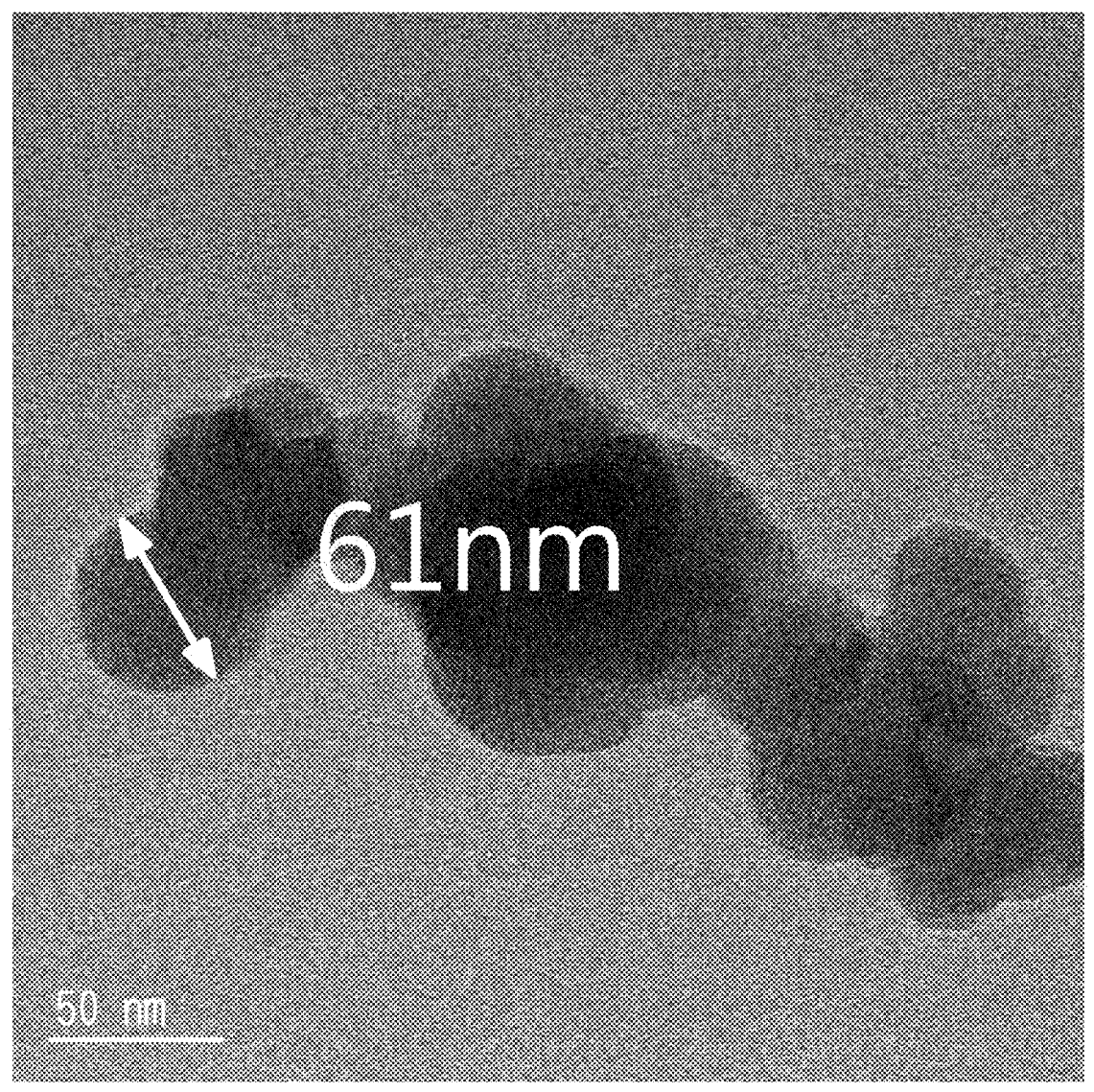

In the present disclosure, "between X and Y" is equivalent to "X~Y", and includes the end values X and Y.

The carbon black provided by the present disclosure satisfies the following conditions (a) and (b).

Condition (a): Nitrogen adsorption specific surface area (NSA) is greater than 0 m²/g and less than or equal to 130 m²/g. In some embodiments, the nitrogen adsorption specific surface area is greater than 0 m²/g and less than or equal to 65 m²/g. In some embodiments, the nitrogen adsorption specific surface area is greater than 0 m²/g and less than or equal to 40 m²/g. In some embodiments, the nitrogen adsorption specific surface area is greater than 0 m²/g and less than or equal to 36 m²/g. In some embodiments, the nitrogen adsorption specific surface area is greater than 0 m²/g and less than or equal to 32 m²/g. In some embodiments, the nitrogen adsorption specific surface area is between any two of the following values: 5, 10, 15, 20, 25 and 30 m²/g.

Condition (b): Oil absorption number (OAN) is greater than 0 cc/100 g and less than or equal to 95 cc/100 g. In some embodiments, the oil absorption number is greater than 0 cc/100 g and less than or equal to 92 cc/100 g. In some embodiments, the oil absorption number is greater than 0 cc/100 g and less than or equal to 80 cc/100 g. In some embodiments, the oil absorption number is between any two of the following values: 5, 10, 15, 20, 25, 30, 35, 40, 45, 50, 55, 60, 65, 70 and 77 cc/100 g.

The carbon black can further satisfy the following condition (c).

Condition (c): The primary particle size is 45 to 70 nm. In some embodiments, the primary particle size is 50 to 70 nm.

The carbon black can further satisfy the following condition (d).

Condition (d): The particle size of the aggregate ranges from 120 to 550 nm. In some embodiments, the particle size of the aggregate ranges from 120 to 400 nm.

In some embodiments, the carbon black meets the following conditions: NSA is 32~40 m$^2$/g; OAN is 85~95 cc/100 g; the primary particle size is 45~65 nm; and the aggregates particle size is 200~550 nm.

In some embodiments, the carbon black meets the following conditions: NSA is 20~32 m$^2$/g; OAN is 70~85 cc/100 g; the primary particle size is 50~70 nm; and the aggregates particle size is 120~400 nm.

The carbon black can further satisfy the following condition (e).

Condition (e): The volatile content ranges from 1 wt % to 5 wt %. In some embodiments, the volatile content is between any two of the following values: 1.2 wt %, 1.4 wt %, 1.6 wt %, 1.8 wt %, 2 wt %, 2.2 wt %, 2.4 wt %, 2.6 wt %, 2.8 wt %, 3.5 wt %, 4.0 wt % and 4.5 wt %. In some embodiments, the volatile content ranges from 1.3 wt % to 3 wt %.

The carbon black can further satisfy the following condition (f).

Condition (f): The resistivity is greater than or equal to 0.020 Ω*cm, for example: 0.020~0.060 Ω*cm. In some embodiments, the resistivity is greater than or equal to 0.022 Ω*cm. In some embodiments, the resistivity is greater than or equal to 0.024 Ω*cm.

The present disclosure also provides a sealant, which includes: a resin; a hardener; and the aforementioned carbon black. The resin can be known to those with ordinary knowledge in the technical field to which the disclosure belongs, and includes but is not limited to: epoxy resin (such as bisphenol A epoxy resin, bisphenol F epoxy resin), polyurethane, and organic silicon. Examples of the hardener are well known to those with ordinary knowledge in the technical field to which the invention belongs, and will not be described in detail herein.

The sealant may further include a defoaming agent. The defoaming agent includes: BYK 1760, BYK A530, BASF SI2008, but is not limited thereto. The defoaming agent can be used alone or in combination.

The present disclosure further provides a use of the carbon black described above, which is used for a sealant.

In some embodiments, the sealant is electronic potting glue.

Production Example: Production of Carbon Black

The carbon blacks of Production Examples 1 and 2 are manufactured by modifying the N774 carbon black and N660 carbon black using the carbon material post-modification treatment system disclosed in Taiwan Patent No. 1796678B. The production conditions are as shown in Table 1. The content of Taiwan Patent No. 1796678B is incorporated herein by reference in its entirety.

4

Table 2 shows the nitrogen adsorption specific surface area (NSA), carbon black oil absorption number (OAN), resistivity and volatile content of the carbon black powder itself of Production Example 1, Production Example 2 and Comparative Example 1. Comparative Example 1 in Table 2 uses the commercially available carbon black. The measurement items listed in Table 2 are carried out in the following manner:

NSA

The carbon black specific surface area is measured according to ASTM D6556. The gas pressure of gas adsorbed and desorbed on the surface and pores of carbon black at a constant temperature is measured using the nitrogen surface area as the total surface area of the outer surface area and inner surface area according to the BET theoretical formula. The specific surface area is calculated using the gas molecule cross-sectional area, the gas molecule volume and the sample weight.

$$\frac{P}{V_a(P_0 - P)} = \frac{1}{V_m C} + \frac{C-1}{V_m C} \times \frac{P}{P_0}$$

P is the pressure, P0 is the saturation pressure, $V_a$ is the total absorption volume, C is the BET constant, and $V_m$ is the gas volume required to form a single layer.

OAN

Carbon black OAN is measured according to ASTM D2414. The quantitative carbon black is weighed and titrated to the end point using white mineral oil with a density of 1.042 to 1.047 g/cm3. The absorption value is calculated based on the weight and the titration amount of the carbon black sample, and substituted into the following formula to obtain the OAN value.

$$D = \frac{V}{M} \times 100$$

D = White mineral oil (petroleum) absorption value of soot

V: Volume of consumed white mineral oil (petroleum)

M: Sample weight

Resistivity

Using PRCD2100 (manufactured by IEST) powder impedance measurement instrument, a quantitative amount of carbon black is weighed, a pressure of 10~200 MPa is

TABLE 1

| Production Example | Raw material grade | Carbon black feeding amount per batch | Quantitative pacer (%) | Rotation speed of reactor screw (%) | Ozone flow rate (L/min) | Ozone concentration (g/m$^3$) | Reaction time (min) |
|---|---|---|---|---|---|---|---|
| 1 | N774 | 7~10 Kg | 18~30 | 50~70 | 35/35 | 50~200 | 40~60 |
| 2 | N660 | 7~10 Kg | 18~30 | 50~70 | 35/35 | 50~200 | 40~60 | continuously applied, and the pressure is maintained for 10 s to measure the powder impedance.

Volatile Content

The organic compounds released by baking carbon black at 950° C. for 7 minutes, including residual oil, adhesives, and surface functional groups, are measured and may be obtained by measuring the weight of the crucible before and after the carbon black is burned and calculating the loss percentage.

TABLE 2

|  | Production Example 1 | Production Example 2 | Comparative Example 1 |
|---|---|---|---|
| NSA (m²/g) | 30 | 35 | 35 |
| OAN (cc/100 g) | 75 | 91 | 100 |
| Resistivity (Ω*cm) | 0.025 | 0.023 | 0.015 |
| Volatile content (%) | 1.60 | 1.60 | 1.60 |

From the results of Table 2, it can be seen that the carbon black of Production Example 1 and Production Example 2 can obtain excellent resistivity by setting NSA below 130 m²/g and OAN below 95 cc/100 g. To obtain better resistivity, NSA and OAN can be further reduced.

FIG. 1A, FIG. 1B, FIG. 1C and FIG. 1D are transmission electron microscope (TEM) photos taken at different locations on the carbon black of Production Example 1. As shown in FIG. 1A, FIG. 1B, FIG. 1C and FIG. 1D, the primary particle size of the carbon black of Production Example 1 is 65 nm, 68 nm, 58 nm, 59 nm and 61 nm, which are between 50 nm and 70 nm.

Figure 2A:
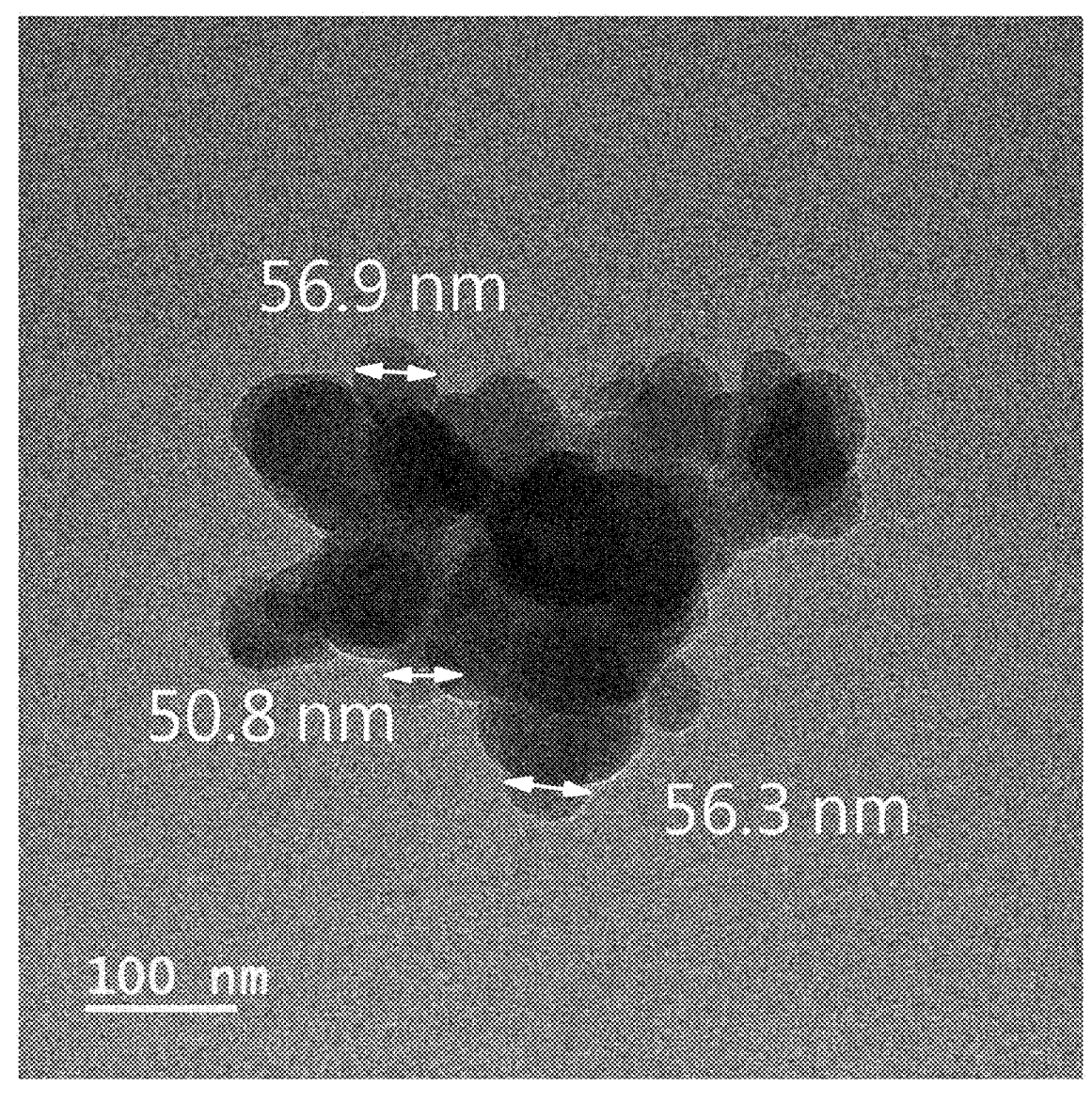
FIG. 2A, FIG. 2B and FIG. 2C are transmission electron microscope (TEM) photos of the carbon black of Production Example 2.
Figure 2B:
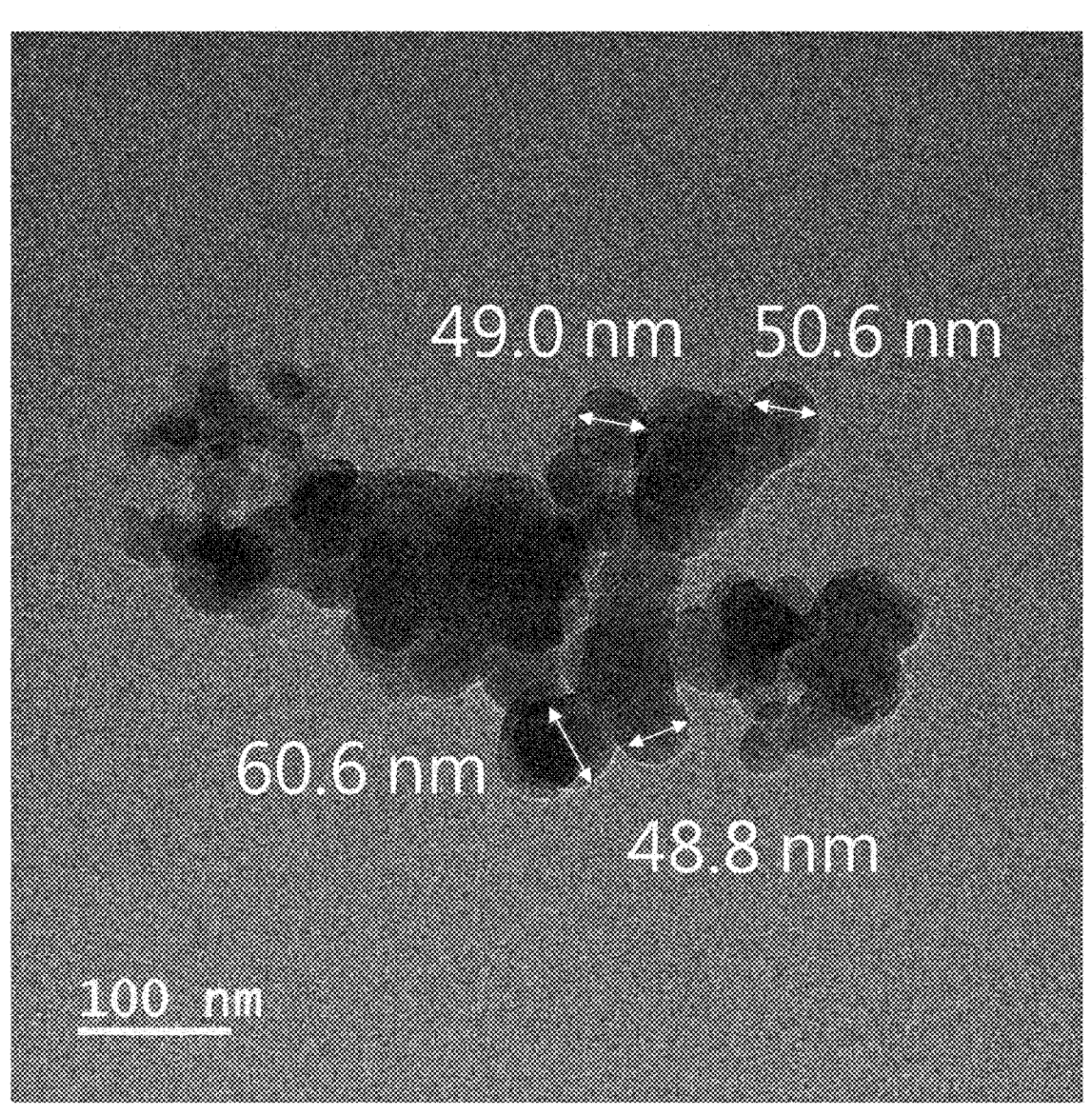
Figure 2C:
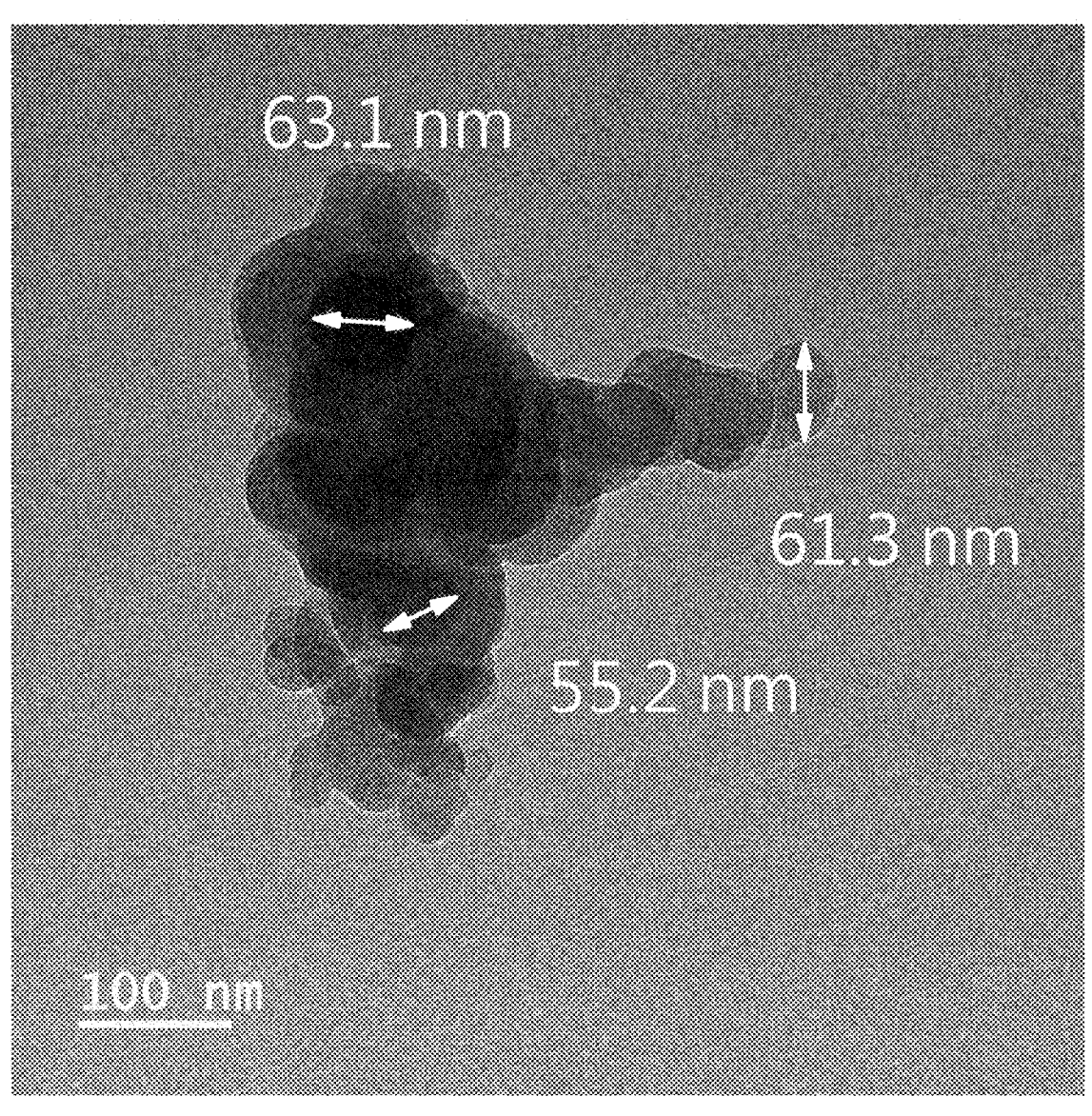

FIG. 2A, FIG. 2B and FIG. 2C are transmission electron microscope (TEM) photos taken at different locations on the carbon black of Production Example 2. As shown in FIG. 2A, FIG. 2B and FIG. 2C, the primary particle size of the carbon black of Production Example 2 is 56.9 nm, 50.8 nm, 56.3 nm, 49.0 nm, 50.6 nm, 60.6 nm, 48.8 nm, 63.1 nm, 61.3 nm and 55.2 nm, which are between 45 nm and 65 nm.

Figure 3A:
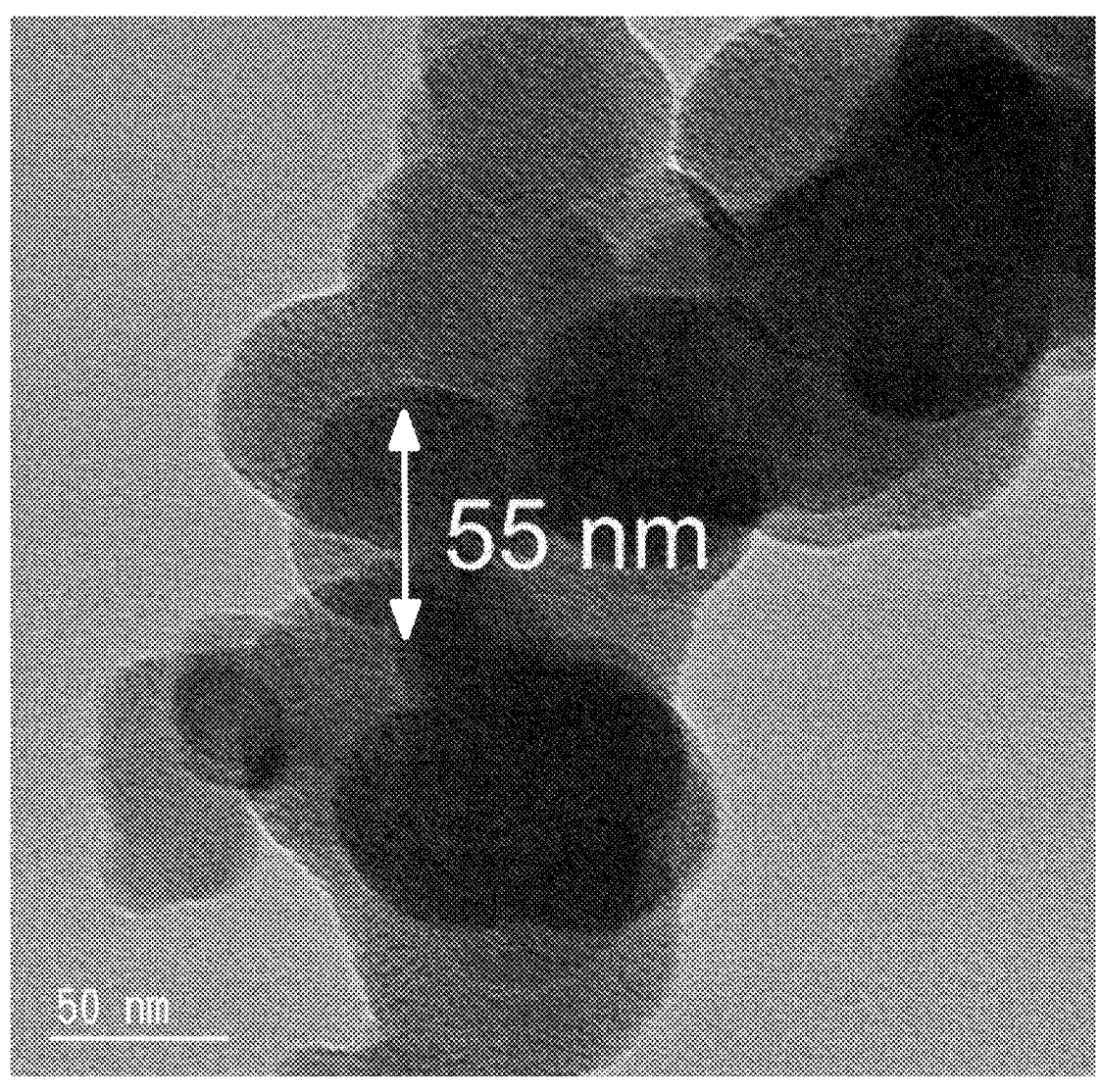
FIG. 3A, FIG. 3B and FIG. 3C are transmission electron microscope (TEM) photos of the carbon black of Comparative Example 1.
Figure 3B:
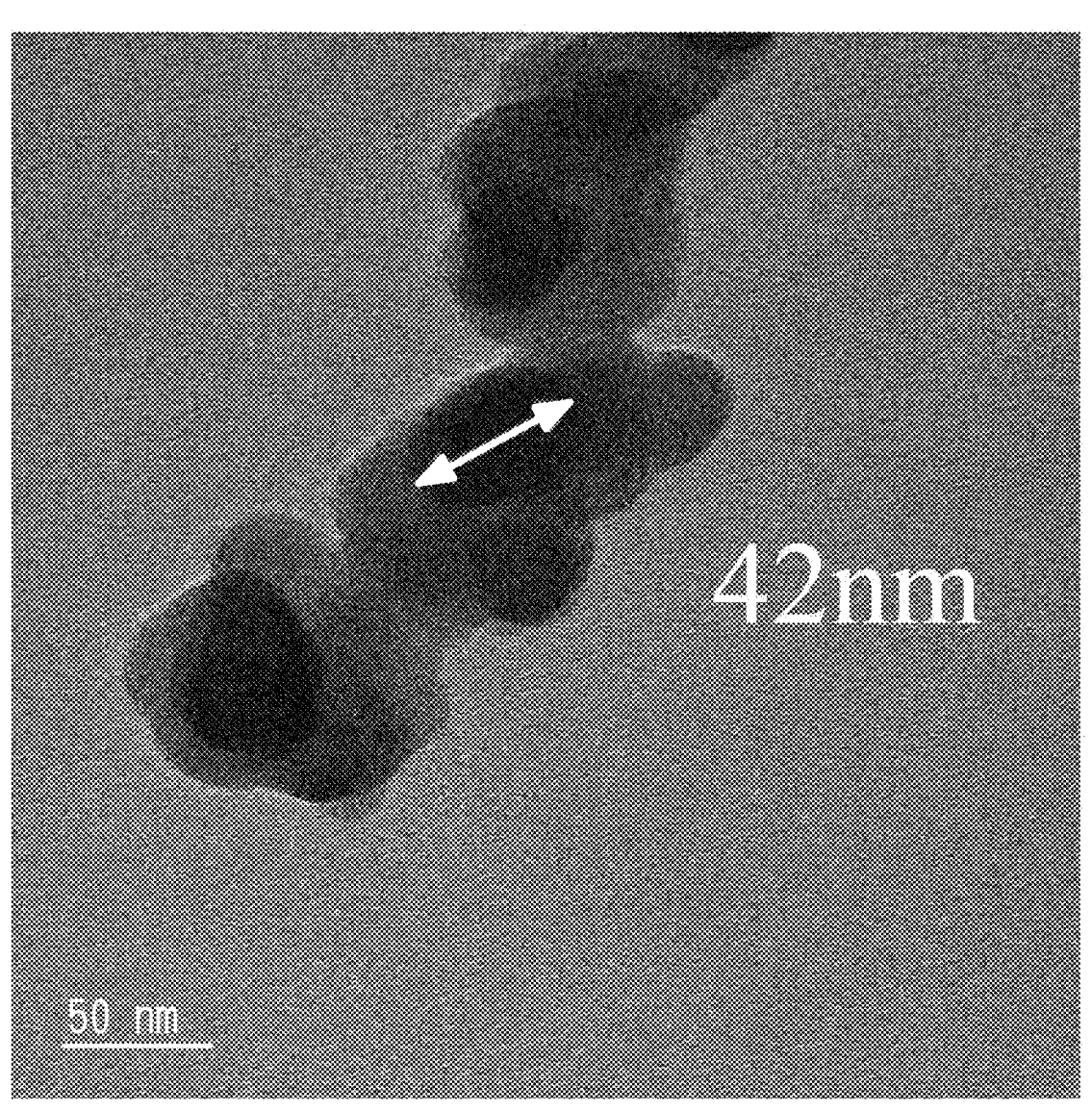
Figure 3C:
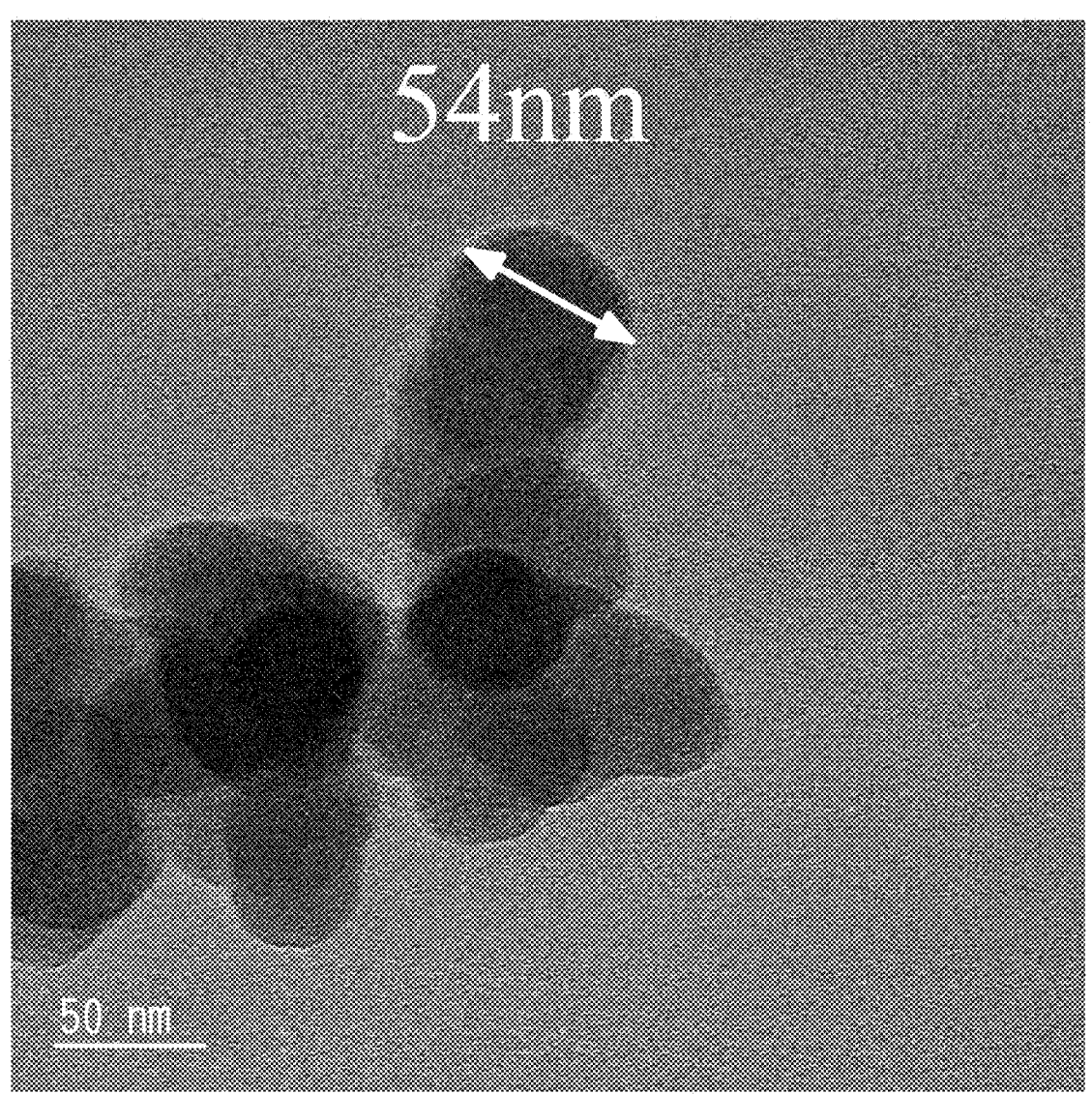

FIG. 3A, FIG. 3B and FIG. 3C are transmission electron microscope (TEM) photos taken at different locations on the carbon black of Comparative Example 1. As shown in FIG. 3A, FIG. 3B and FIG. 3C, the primary particle size of the carbon black of Comparative Example 1 is 55 nm, 42 nm and 54 nm.

Figure 4A:
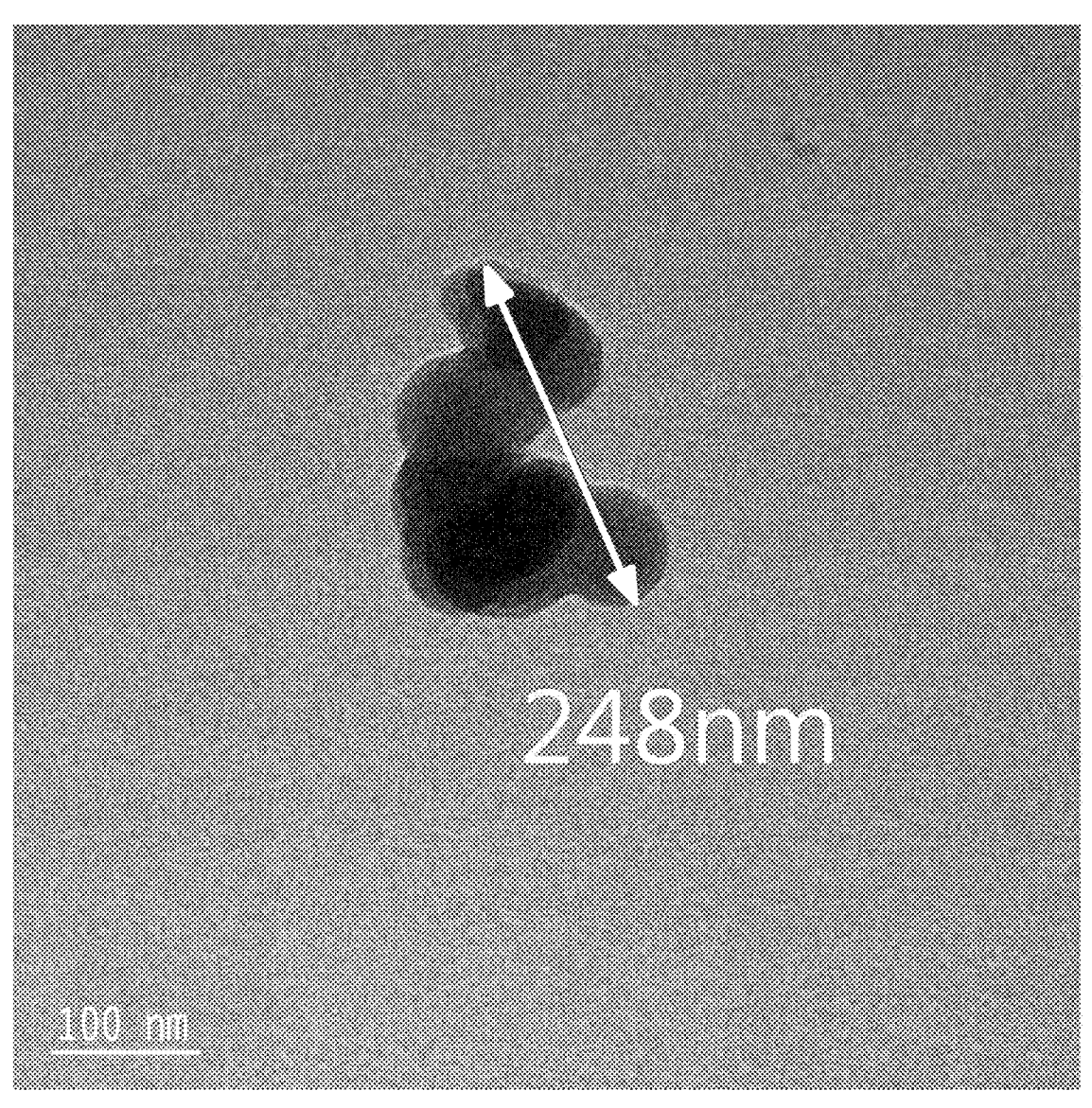
FIG. 4A, FIG. 4B and FIG. 4C are transmission electron microscope (TEM) photos of the carbon black of Production Example 1.
Figure 4B:
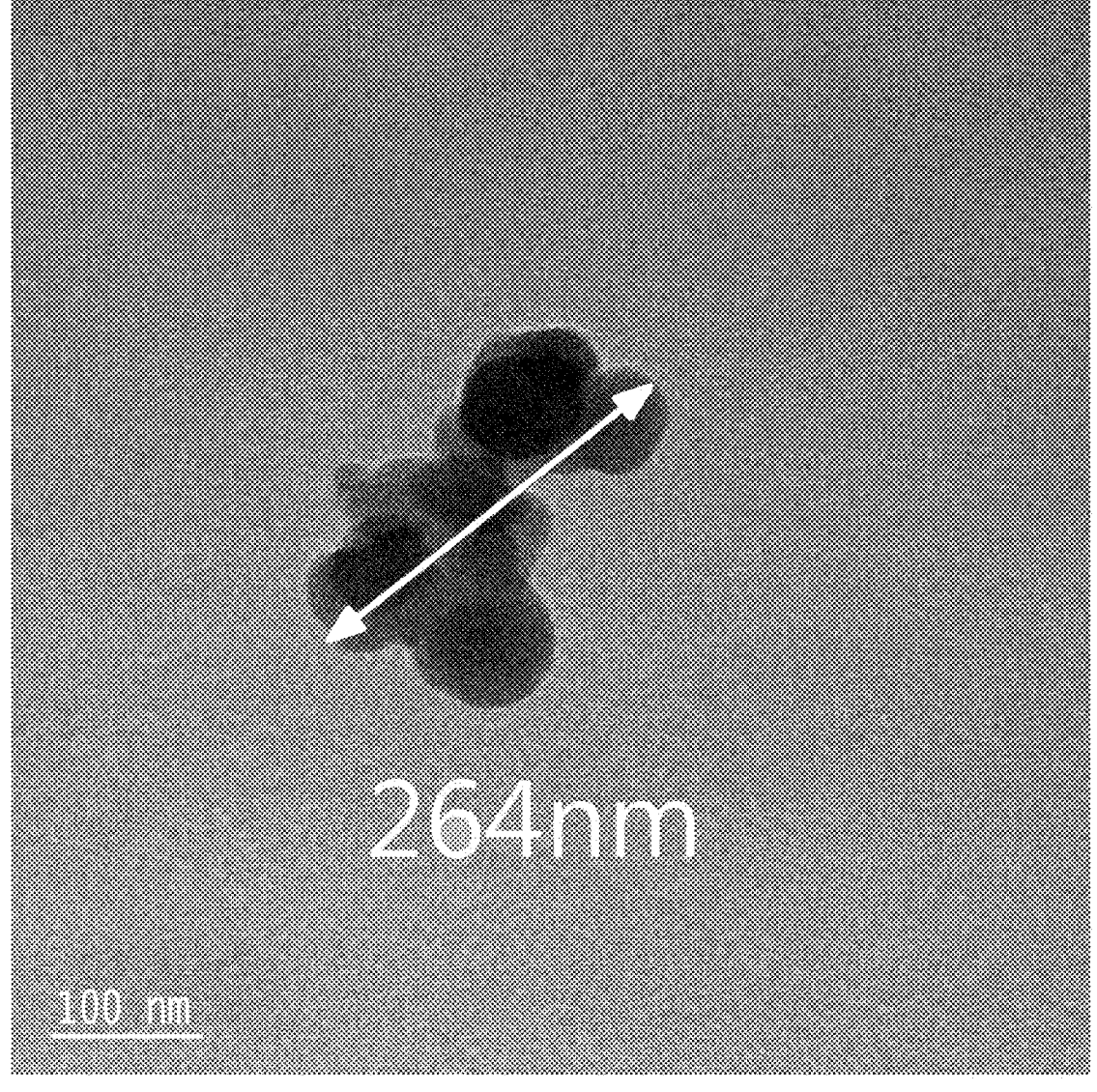
Figure 4C:
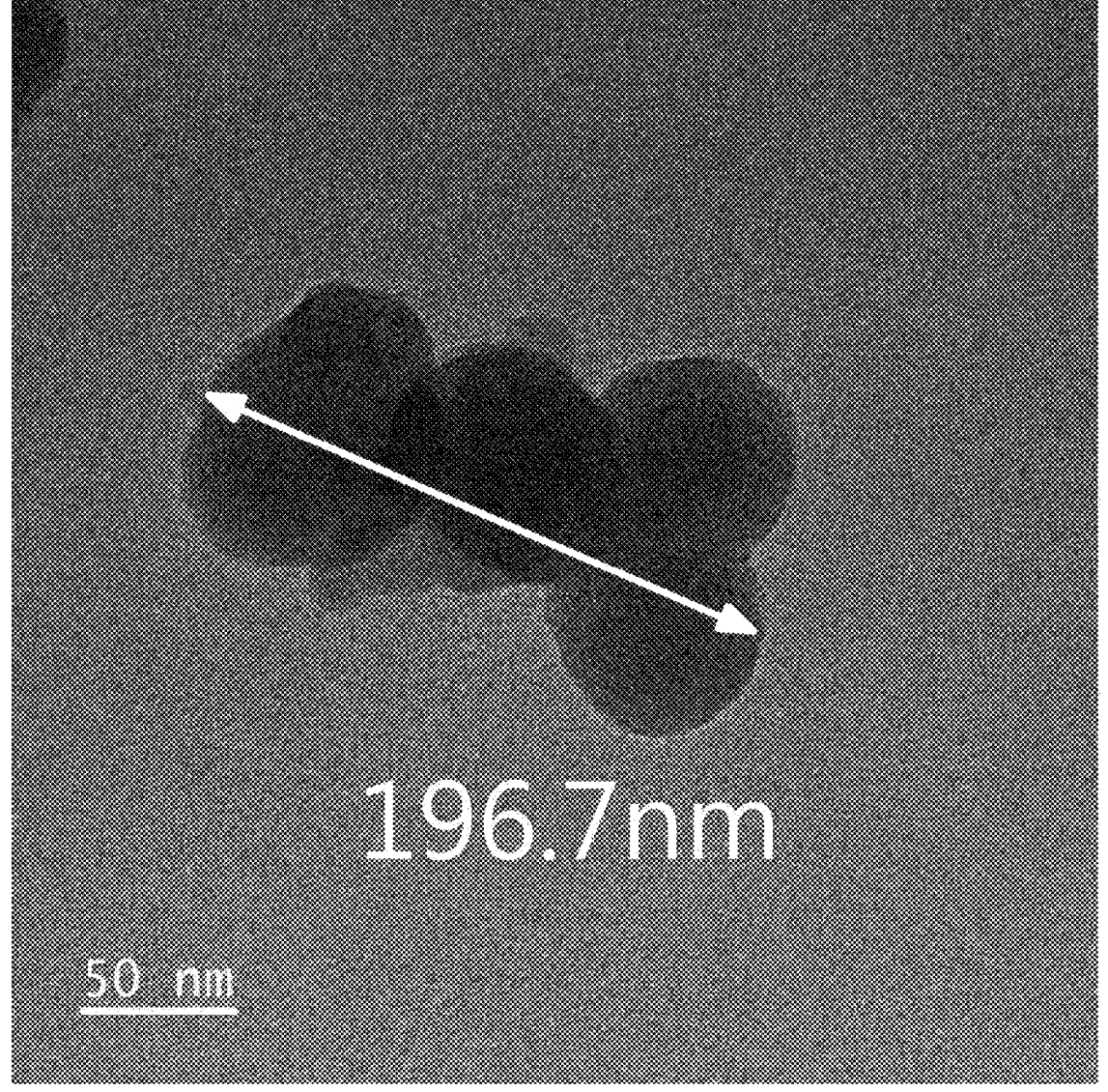
Figure 5A:
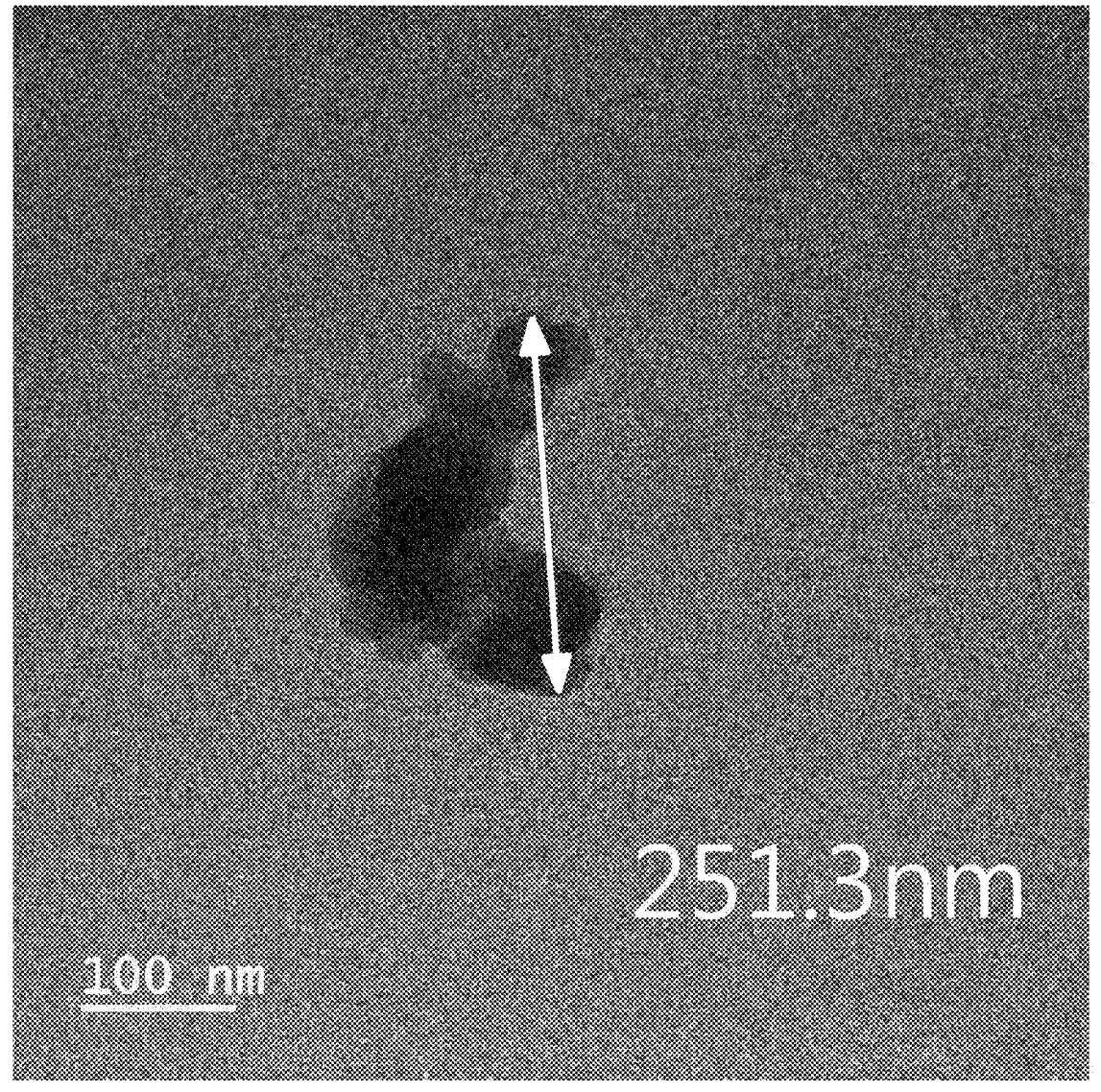
FIG. 5A, FIG. 5B, FIG. 5C, FIG. 5D, FIG. 5E and FIG. 5F are transmission electron microscope (TEM) photos of the carbon black of Production Example 2.
Figure 5B:
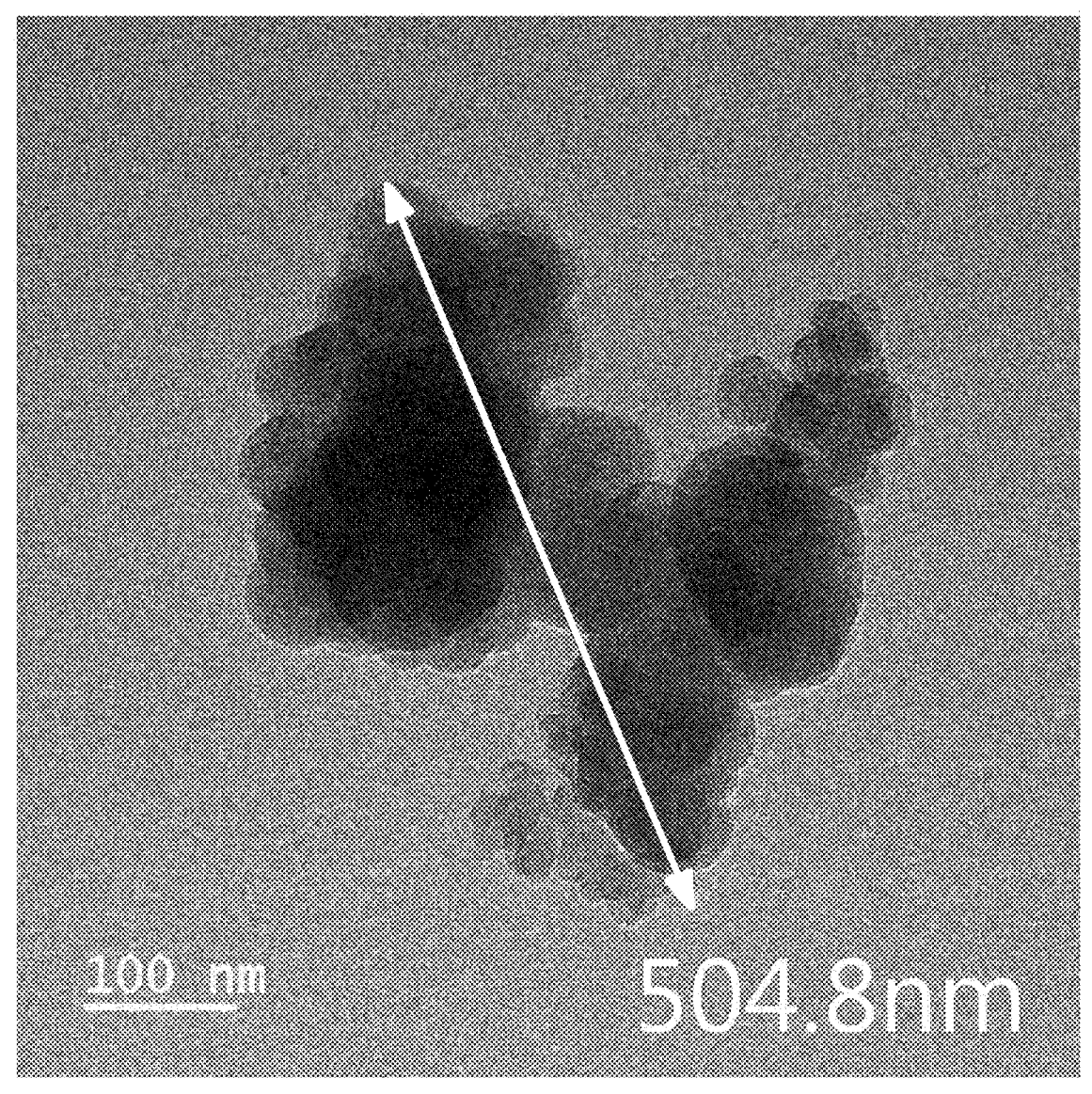
Figure 5C:
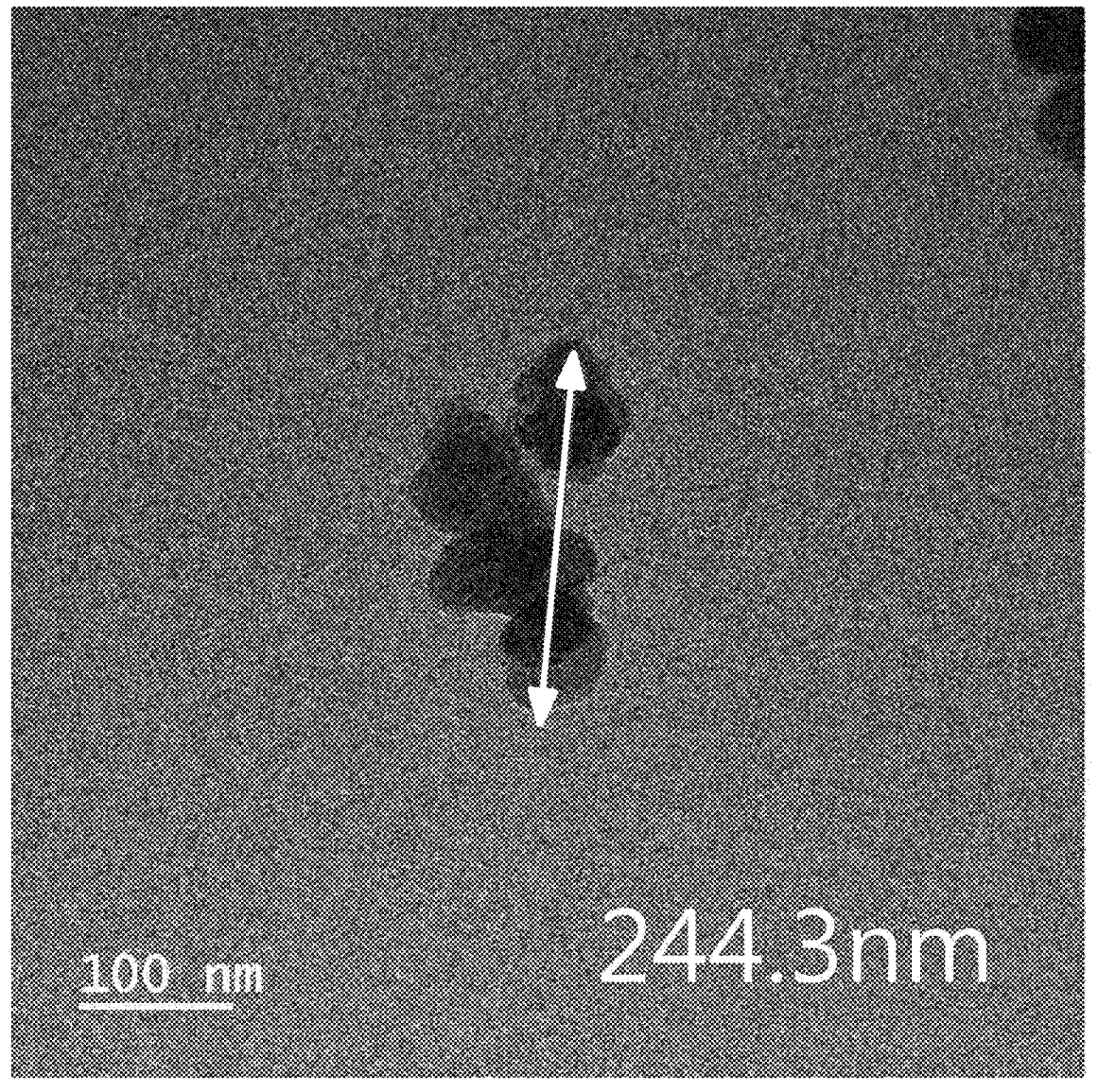
Figure 5D:
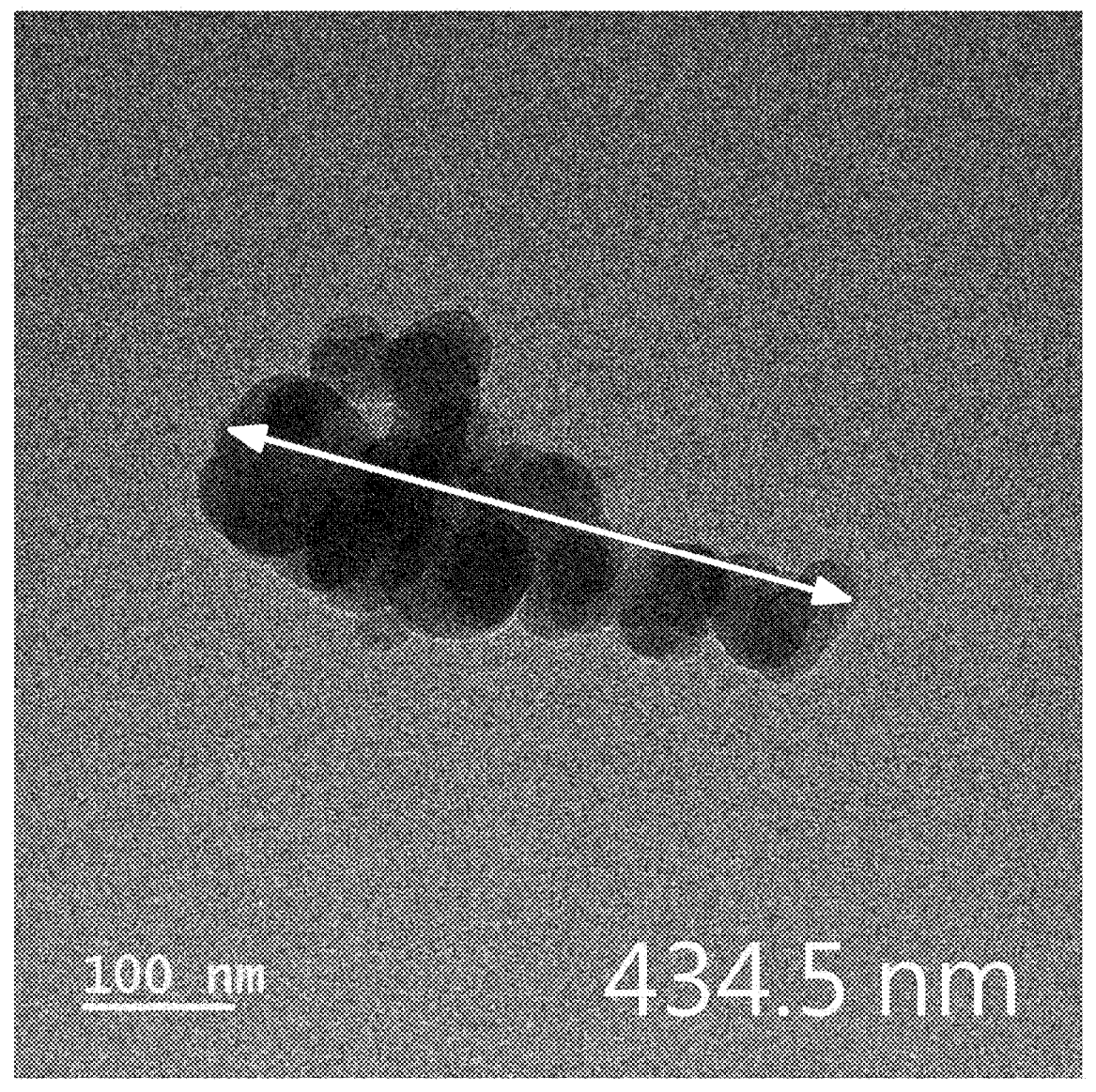
Figure 5E:
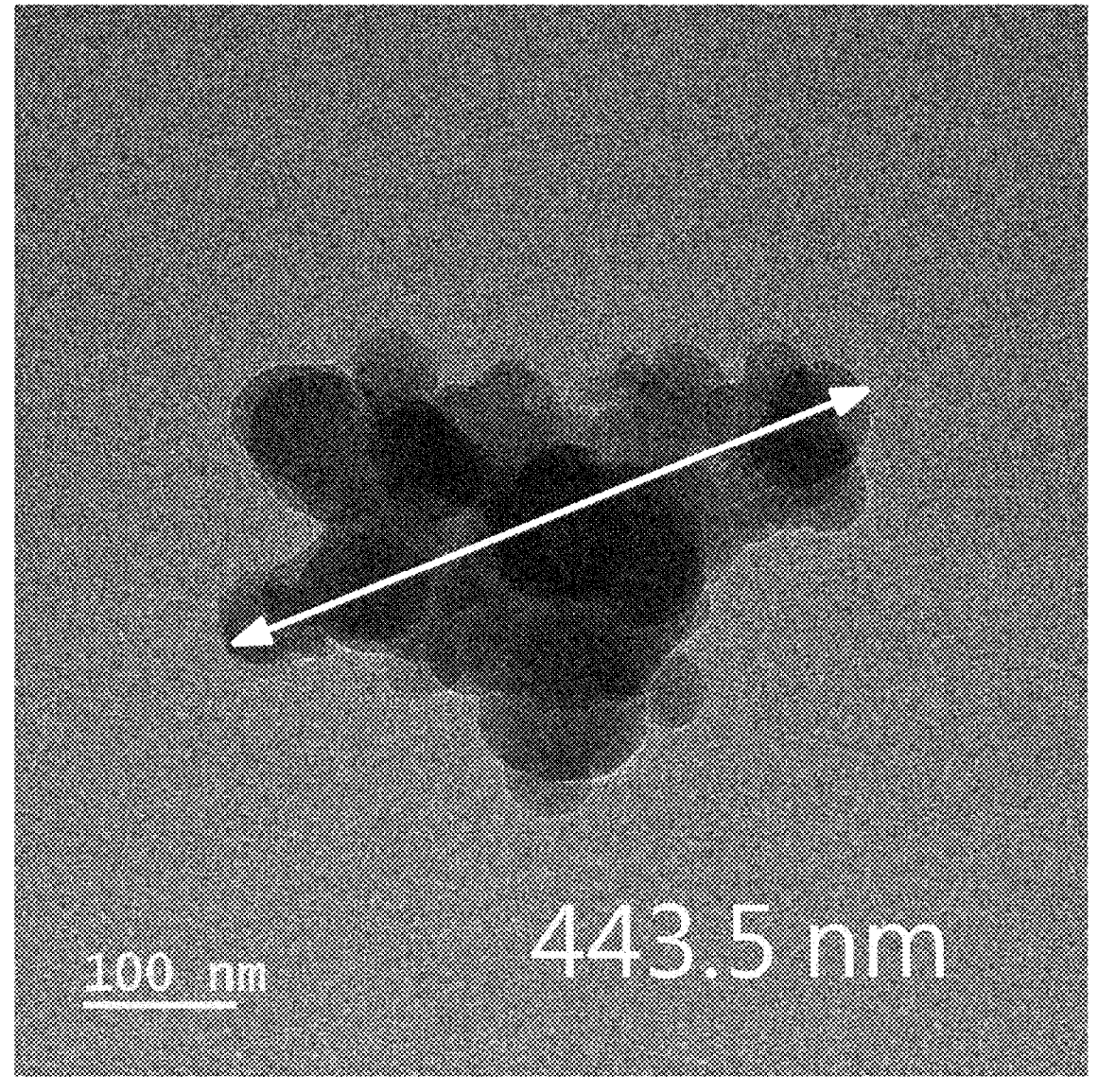
Figure 5F:
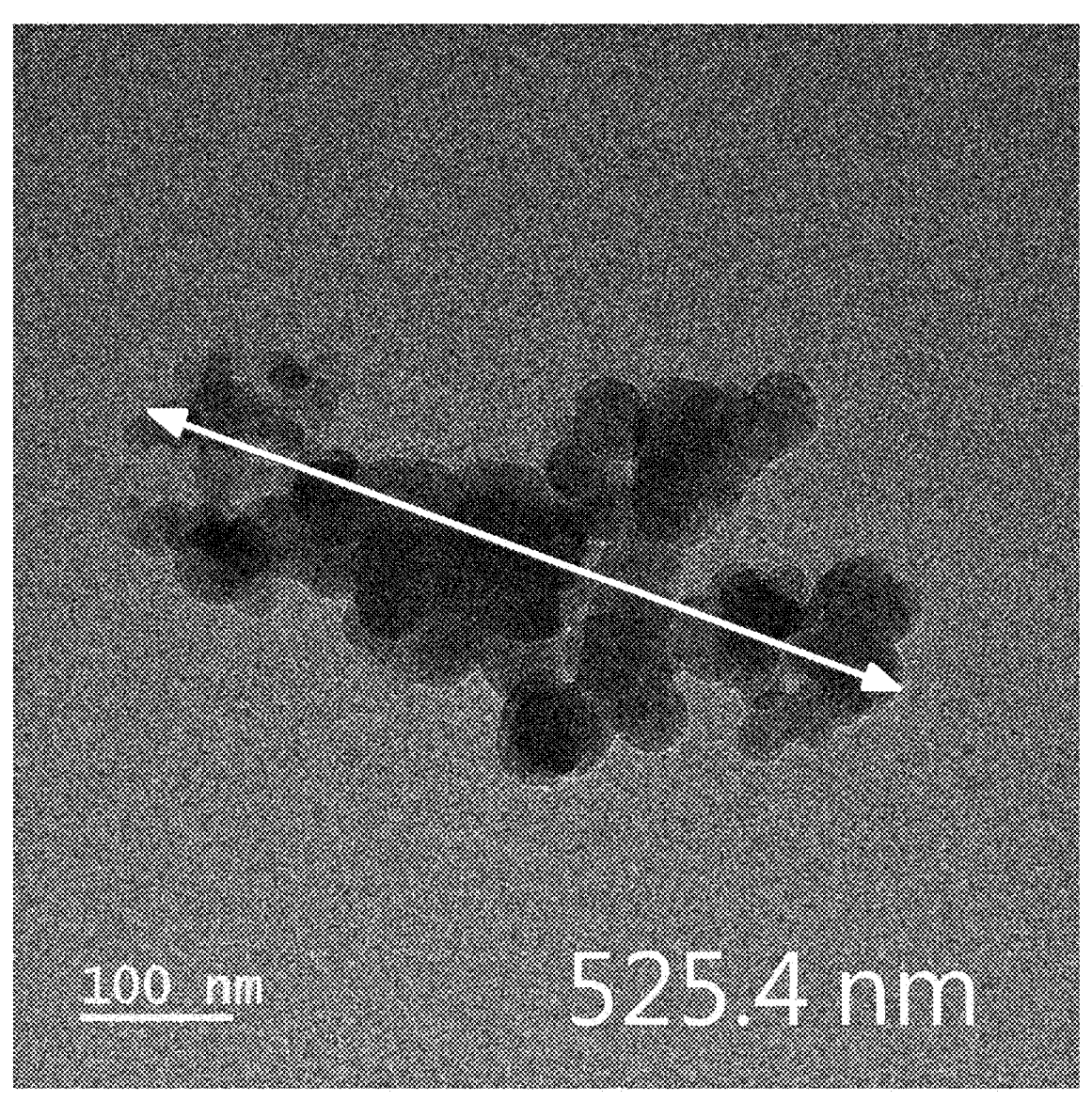

FIG. 4A, FIG. 4B and FIG. 4C are transmission electron microscope (TEM) photos taken at different locations on the carbon black of Production Example 1. As shown in FIG. 4A, FIG. 4B and FIG. 4C, the particle size of aggregates of the carbon black of Production Example 1 is 248 nm, 264 nm and 196.7 nm, which are between 120 nm and 400 nm.

FIG. 5A, FIG. 5B, FIG. 5C, FIG. 5D, FIG. 5E and FIG. 5F are transmission electron microscope (TEM) photos taken at different locations on the carbon black of Production Example 2. As shown in FIG. 5A, FIG. 5B, FIG. 5C, FIG. 5D, FIG. 5E and FIG. 5F, the particle size of aggregates of the carbon black of Production Example 2 is 251.3 nm, 504.8 nm, 244.3 nm, 434.5 nm, 443.5 nm and 525.4 nm, which are between 200 nm and 550 nm.

Figure 6A:
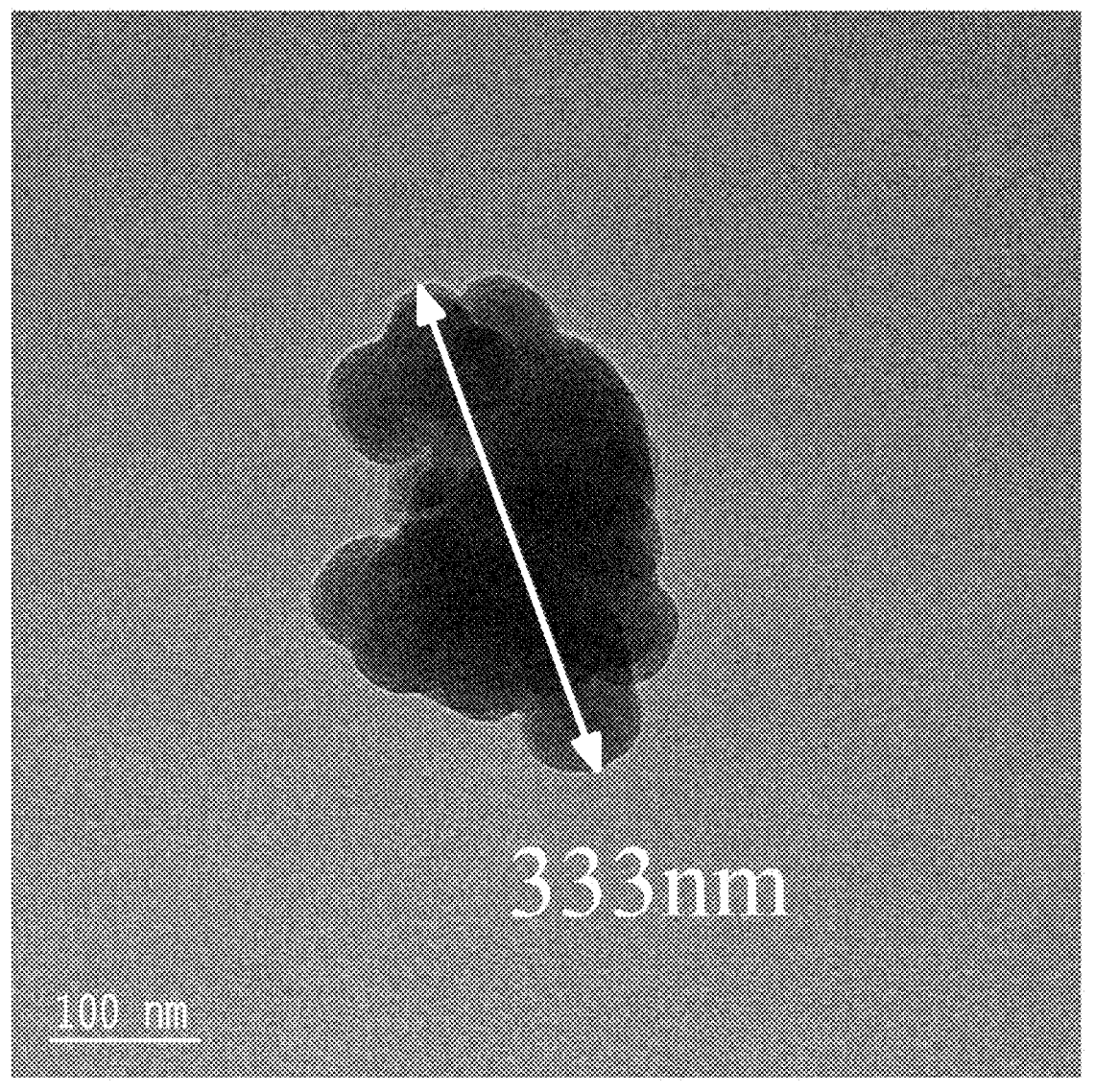
FIG. 6A and FIG. 6B are transmission electron microscope (TEM) photos of the carbon black of Comparative Example 1.
Figure 6B:
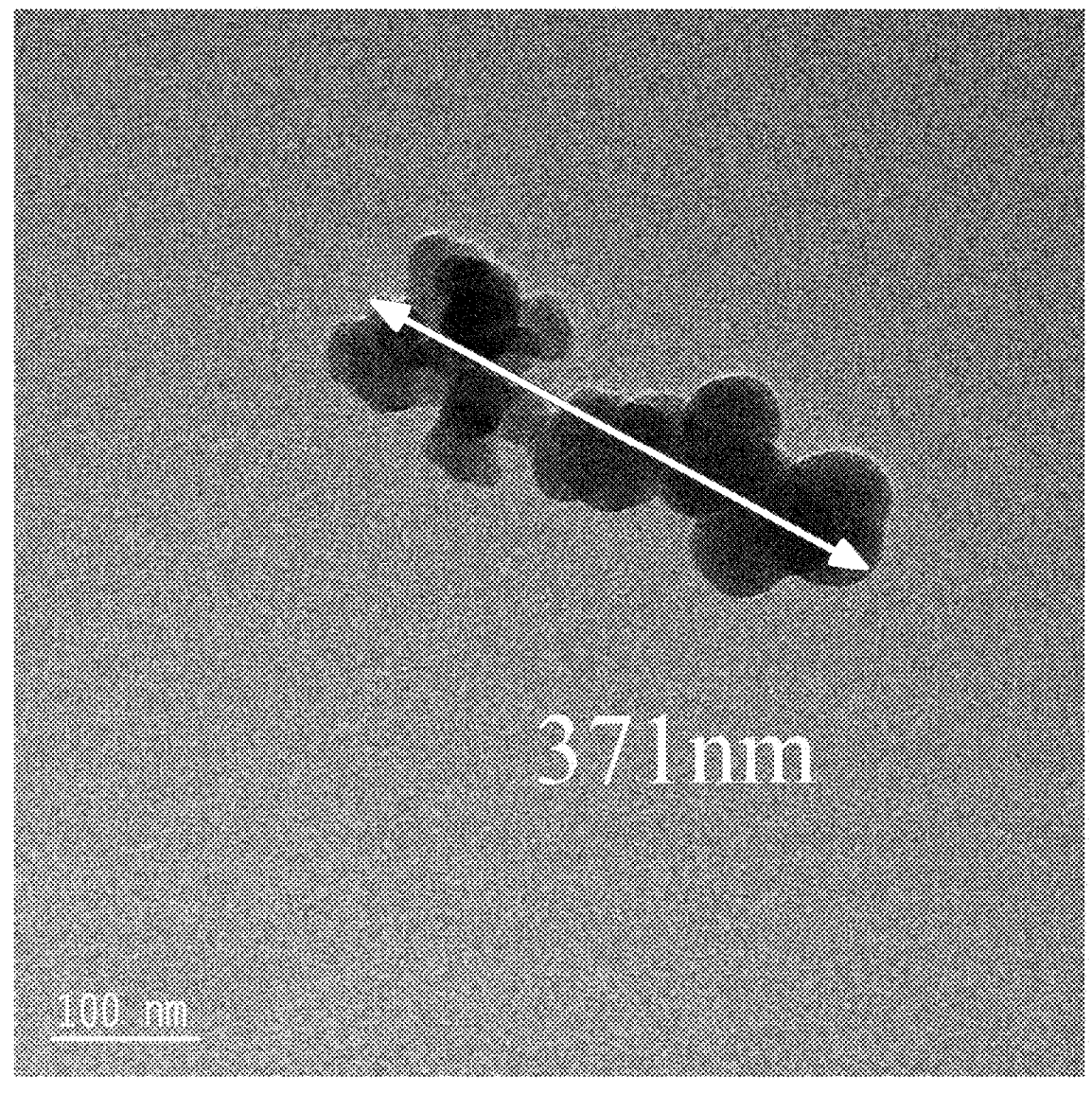

FIG. 6A and FIG. 6B are transmission electron microscope (TEM) photos taken at different locations on the carbon black of Comparative Example 1. As shown in FIG. 6A and FIG. 6B, the particle size of aggregates of the carbon black of Comparative Example 1 is 333 nm and 371 nm, which are between 300 nm and 550 nm.

Example: Manufacturing of Electronic Potting Glue

Using The carbon black of Production Example 1, Production Example 2 and Comparative Example 1 are use and mixed according to the ingredients and proportions listed in Table 3 to prepare the electronic potting glues of Example 1, Example 2 and Comparative Example 2 respectively.

TABLE 3

| Ingredients | Weight (g) |
|---|---|
| Epoxy resin (Nanya's NPEL-128E) | 20 |
| Hardener (Huntsman JEFFAMINE D-230) | 6.6 |
| Carbon black | 0.83 |
| Defoaming agent (BASF SI2008) | 0.13 |
| Total weight | 27.56 |
| Carbon black content (%) | 3.0 (i.e., 0.83/27.56*100%) |

The electronic potting glue of Example 1, Example 2 and Comparative Example 2 is poured into the mold, placed in an 80° C. oven, and heated for 1 hr to obtain a sample piece to be tested. After cooling, the film thickness is measured with a film thickness meter (Covina C2401A01), the volume resistance is measured with a high insulation resistance meter (HIOKI SM7120), and then the volume resistivity is obtained through calculation using the following formula. The results are shown in Table 4.

$$\text{Volume resistivity}(\Omega*cm)=\text{resistance value (measured value, in } \Omega)\times19.6\div\text{film thickness (cm)}$$

TABLE 4

|  | Example 1 | Example 2 | Comparative Example 2 |
|---|---|---|---|
| Carbon black content (%) | 3 | 3 | 3 |
| Film thickness (mm) | 1.44 | 1.75 | 1.58 |
| Volume resistivity (Ω*cm) | 5.09E+17 | 2.08E+17 | 7.74E+16 |

As shown in Table 4, the cured film formed by the electronic potting glue of the present disclosure has excellent volume resistivity, that is, the cured film has excellent insulation properties.

To sum up, the present disclosure limits carbon black to specific conditions and can obtain highly insulating carbon black. When this carbon black is applied to a sealant, the sealant can also have high insulating properties.

However, the above are only preferred embodiments of the present disclosure, which cannot be used to limit the implementation scope of the present disclosure, that is, all the simple equivalent changes and modifications made based on the claims and specification of the present disclosure fall within the scope of the claimed invention.

What is claimed is:

1. A carbon black satisfying the following conditions (a), (b), (e) and (f):
   (a) a nitrogen adsorption specific surface area (NSA) being greater than 0 m²/g and less than or equal to 130 m²/g;
   (b) an oil absorption number being greater than 0 cc/100 g and less than or equal to 95 cc/100 g;
   (e) a volatile content of 1.6 wt % to 5 wt %; and
   (f) a resistivity being greater than or equal to 0.020 Ω*cm.

2. The carbon black of claim 1, wherein the nitrogen adsorption specific surface area is greater than 0 m²/g and less than or equal to 65 m²/g.

3. The carbon black of claim 2, wherein the nitrogen adsorption specific surface area is greater than 0 m²/g and less than or equal to 36 m²/g.

4. The carbon black of claim 3, wherein the nitrogen adsorption specific surface area is greater than 0 m²/g and less than or equal to 32 m²/g.

5. The carbon black of claim 1, wherein the oil absorption number is greater than 0 cc/100 g and less than or equal to 92 cc/100 g.

6. The carbon black of claim 5, wherein the oil absorption number is greater than 0 cc/100 g and less than or equal to 80 cc/100 g.

7. The carbon black of claim 1, further satisfying the following conditions (c):

(c) a primary particle size ranging from 45 nm to 70 nm.

8. The carbon black of claim 7, wherein the primary particle size ranges from 50 nm to 70 nm.

9. The carbon black of claim 1, further satisfying the following conditions (d):

(d) an aggregate particle size ranging from 120 nm to 550 nm.

10. The carbon black of claim 9, wherein the aggregate particle size ranges from 120 nm to 400 nm.

11. A sealant, comprising: a resin; a hardener; and the carbon black of claim 1.

12. The sealant of claim 11, further comprising a defoaming agent.

13. The sealant of claim 11, which is electronic potting glue.

14. A use of the carbon black of claim 1, which is used for a sealant.

15. The use of claim 14, wherein the sealant is electronic potting glue.

\* \* \* \* \*